US012127220B2

United States Patent
Liao et al.

(10) Patent No.: US 12,127,220 B2
(45) Date of Patent: *Oct. 22, 2024

(54) METHOD FOR PERFORMING 2-STAGE DOWNLINK CONTROL INFORMATION BASED CROSS-CARRIER SCHEDULING IN CARRIER AGGREGATION

(71) Applicant: MEDIATEK INC., Hsinchu (TW)

(72) Inventors: Pei-Kai Liao, Hsinchu (TW); Cheng-Hsun Li, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,796

(22) Filed: Sep. 6, 2023

(65) Prior Publication Data

US 2023/0422266 A1 Dec. 28, 2023

Related U.S. Application Data

(63) Continuation of application No. 17/351,398, filed on Jun. 18, 2021, now Pat. No. 11,785,611.

(Continued)

(51) Int. Cl.
*H04J 3/00* (2006.01)
*H04W 72/0446* (2023.01)
*H04W 72/23* (2023.01)

(52) U.S. Cl.
CPC ....... *H04W 72/23* (2023.01); *H04W 72/0446* (2013.01)

(58) Field of Classification Search
CPC ............. H04W 72/23; H04W 72/0446; H04W 72/1263; H04L 5/001; H04L 5/0048; H04L 5/0053

See application file for complete search history.

(56) References Cited

U.S. PATENT DOCUMENTS

| 9,236,992 B2 | 1/2016 | Chung |
| 10,021,677 B2 | 7/2018 | Mallik |

(Continued)

FOREIGN PATENT DOCUMENTS

| CN | 102577291 A | 7/2012 |
| CN | 105612801 A | 5/2016 |

(Continued)

OTHER PUBLICATIONS

Chinese language office action dated Mar. 17, 2022, issued in application No. TW 110124000.

(Continued)

*Primary Examiner* — Abdelnabi O Musa
(74) *Attorney, Agent, or Firm* — McClure, Qualey & Rodack, LLP

(57) ABSTRACT

A method includes receiving a higher-layer signal from a base station, wherein the higher-layer signal enables the use of 2-stage DCI based cross-carrier scheduling and provides mapping between a scheduling serving cell and one or more scheduled serving cells; receiving a first-stage DCI carried in a PDCCH in a designated time interval in the scheduling serving cell, wherein the first-stage DCI provides the information related to the corresponding second-stage DCI; receiving a second-stage DCI corresponding to the first-stage DCI in a specific set of resource elements in the same designated time interval in the same scheduling cell as the first-stage DCI-based on the information provided in the first-stage DCI, wherein the second-stage DCI provides scheduling information for the scheduled serving cells; and performing data reception or transmission over the scheduled serving cells based on the received 2-stage DCI.

23 Claims, 6 Drawing Sheets

Related U.S. Application Data

(60) Provisional application No. 63/061,819, filed on Aug. 6, 2020, provisional application No. 63/054,840, filed on Jul. 22, 2020, provisional application No. 63/049,710, filed on Jul. 9, 2020.

(56) References Cited

U.S. PATENT DOCUMENTS

| | | | |
|---|---|---|---|
| 10,484,986 B2 | 11/2019 | Liao | |
| 10,548,124 B2 | 1/2020 | Chen | |
| 11,240,805 B2* | 2/2022 | Yano | H04W 72/20 |
| 11,974,304 B2 | 4/2024 | Hua | |
| 2011/0019776 A1* | 1/2011 | Zhang | H04L 5/0023 |
| | | | 375/340 |
| 2014/0079008 A1* | 3/2014 | Park | H04L 5/001 |
| | | | 370/329 |
| 2014/0254410 A1 | 9/2014 | Seo | |
| 2015/0092712 A1* | 4/2015 | Kim | H04L 5/0048 |
| | | | 370/329 |
| 2015/0110032 A1 | 4/2015 | Nagata | |
| 2016/0100382 A1* | 4/2016 | He | H04L 5/0044 |
| | | | 370/329 |
| 2016/0128028 A1* | 5/2016 | Mallik | H04L 1/0039 |
| | | | 370/336 |
| 2017/0079065 A1* | 3/2017 | Lyu | H04W 72/23 |
| 2017/0339683 A1 | 11/2017 | Chen et al. | |
| 2018/0092070 A1* | 3/2018 | Liao | H04L 1/0028 |
| 2019/0045533 A1 | 2/2019 | Chatterjee | |
| 2019/0150187 A1 | 5/2019 | Park et al. | |
| 2019/0357238 A1 | 11/2019 | Zhou | |
| 2019/0393987 A1* | 12/2019 | Hong | H04L 1/0061 |
| 2020/0068605 A1* | 2/2020 | Golitschek Edler von Elbwart | H04W 16/14 |
| 2020/0374094 A1* | 11/2020 | Pelletier | H04L 5/001 |
| 2022/0015075 A1* | 1/2022 | Liao | H04L 1/1812 |
| 2022/0053540 A1 | 2/2022 | Takeda | |

FOREIGN PATENT DOCUMENTS

| | | |
|---|---|---|
| CN | 107113136 A | 8/2017 |
| CN | 108352937 A | 7/2018 |
| CN | 110636616 A | 12/2019 |
| WO | 2016119882 A1 | 8/2016 |
| WO | 2017/209585 A1 | 12/2017 |
| WO | 2020053942 A1 | 3/2020 |

OTHER PUBLICATIONS

Huawei, Hisilicon; "Remaining issue on cross-carrier scheduling with different numerology;" 3GPP TSG RAN WG1 Meeting #101-e R1-2003508; Jun. 2020; pp. 1-5.

ITRI; "Discussion on two-stage DCI for NR;" 3GPP TSG-RAN WG1 Meeting #89 R1-1708717; May 2017; pp. 1-4.

Chinese language office action dated Mar. 27, 2024, issued in application No. CN 202110750199.X.

NEC; "On support of DL and UL cross-carrier scheduling in TDD-FDD CA;" R1-135835; 3GPP TSG RAN WG1 Meeting #75; Nov. 2013; pp. 1-6.

Huawei, et al.; "Mechanisms of bandwidth adaptation for control and data reception in single-carrier and multi-carrier cases;" R1-1611655; 3GPP TSG RAN WG1 Meeting #87; Nov. 2016; pp. 1-4.

Huawei, et al.; "Mechanisms of bandwidth adaptation;" R1-1700011; 3GPP TSG RAN WG1 NR Ad Hoc Meeting; Jan. 2017; pp. 1-5.

* cited by examiner

METHOD FOR PERFORMING 2-STAGE DOWNLINK CONTROL INFORMATION BASED CROSS-CARRIER SCHEDULING IN CARRIER AGGREGATION

CROSS REFERENCE TO RELATED APPLICATIONS

This application is a Continuation of pending U.S. patent application Ser. No. 17/351,398, filed on Jun. 18, 2021, which claims priority of and the benefit of U.S. Provisional Application No. 63/049,710, filed on Jul. 9, 2020, U.S. Provisional Application No. 63/054,840, filed on Jul. 22, 2020, and U.S. Provisional Application No. 63/061,819, filed on Aug. 6, 2020, the entirety of which is incorporated by reference herein.

FIELD OF THE DISCLOSURE

The disclosure is related to a scheduling method, and in particular it is related to a method for performing downlink control information (DCI)-based cross-carrier scheduling in carrier aggregation.

DESCRIPTION OF THE RELATED ART

In 3GPP Rel-15/16 5G-NR, compared to single carrier operation, there are shortcomings in terms of DL transmission efficiency for carrier aggregation, such as higher DL control overhead, higher blind decoding complexity for DL control information, and lower DL data efficiency.

For contiguous spectrum, it's possible to apply single carrier operation. For non-contiguous in either intra-band or inter-band cases, carrier aggregation is needed. The shortcomings of carrier aggregation are critical to latency/reliability-sensitive services, e.g. cloud computing/gaming, AR, VR, and industrial IoT, especially from a system capacity perspective. Considering different scenarios, the same or different OFDM subcarrier spacing across serving cells and licensed only or mixed licensed/unlicensed spectrum across serving cells need to be considered for the designs.

BRIEF SUMMARY OF THE DISCLOSURE

In order to resolve the issue described above, the present disclosure provides a method of performing 2-stage downlink control information (DCI)-based cross-carrier scheduling in carrier aggregation. The method is applied to a UE. The method includes receiving a higher-layer signal from a base station, wherein the higher-layer signal enables the use of 2-stage DCI-based cross-carrier scheduling and provides mapping between a scheduling serving cell and one or more scheduled serving cells; receiving a first-stage DCI carried in a PDCCH in a slot in the scheduling serving cell, wherein the first-stage DCI provides the information related to the corresponding second-stage DCI; receiving a second-stage DCI corresponding to the first-stage DCI in a specific set of resource elements in the same slot in the same scheduling cell as the first-stage DCI-based on the information provided in the first-stage DCI, wherein the second-stage DCI provides scheduling information for the scheduled serving cells; and performing data reception or transmission over the scheduled serving cells based on the received 2-stage DCI.

According to the method disclosed above, the information related to the corresponding second-stage DCI in the first-stage DCI at least includes information related to the scheduled serving cells scheduled by the second-stage DCI, and the time-frequency location and size of an occupied radio resource for the scheduling information of the scheduled serving cells in the second-stage DCI.

According to the method disclosed above, the information related to the corresponding second-stage DCI in the first-stage DCI further includes the modulation order of the second-stage DCI.

According to the method disclosed above, the information related to the corresponding second-stage DCI in the first-stage DCI further includes the antenna port of the reference signal used for demodulation of the second-stage DCI.

According to the method disclosed above, the first-stage DCI includes one set of cyclic redundancy check (CRC) bits for the first-stage DCI.

According to the method disclosed above, the second-stage DCI comprises one set of CRC bits for the second-stage DCI.

According to the method disclosed above, the size of the information related to the scheduled serving cells scheduled by the second-stage DCI is based on a higher-layer configuration for two-stage DCI based cross-carrier scheduling.

According to the method disclosed above, the higher-layer configuration is an RRC-layer configuration, and the size of the information related to the scheduled serving cells scheduled by the second-stage DCI is based on a higher-layer configuration (e.g. RRC-layer configuration) for the number of scheduled serving cells scheduled by the scheduling serving cell.

According to the method disclosed above, the time-frequency location and the size of an occupied radio resource for the scheduling information of the scheduled serving cells in the second-stage DCI include: the time-frequency location and the size of an occupied radio resource provided in the first-stage DCI; or the time-frequency location and the size of an occupied radio resource provided in an RRC configuration and the first-stage DCI.

According to the method disclosed above, the time-frequency location and the size of an occupied radio resource provided in the first-stage DCI includes: a starting symbol and a symbol duration in the time domain; and a starting resource block and resource block number in the frequency domain.

According to the method disclosed above, the time-frequency location and the size of an occupied radio resource provided in an RRC configuration and the first-stage DCI includes: a set of candidate time-frequency starting positions provided by the base station via RRC signaling to the UE; and the size of an occupied radio resource and the applied RRC configuration index for time-frequency starting positions indicated by the base station via the first-stage DCI to the UE.

According to the method disclosed above, the first-stage DCI is located in a DL control region, and the second-stage DCI is located in the DL control region, or in a non-DL-control region, or in both the DL control region and the non-DL-control region.

According to the method disclosed above, the scheduling information for the scheduled serving cells is aggregated in ascending or descending order based on a serving cell identification of each of the scheduled serving cells.

According to the method disclosed above, the first-stage DCI provides the scheduling information for one of the scheduled serving cells.

According to the method disclosed above, when there is more than one serving cell to be scheduled by the 2-stage DCI, the second-stage DCI provides the scheduling information for the scheduled serving cells except for the serving cell scheduled by the first-stage DCI.

According to the method disclosed above, the information related to the corresponding second-stage DCI in the first-stage DCI at least includes: information related to the scheduled serving cells scheduled by the second-stage DCI, and the time-frequency location and size of an occupied radio resource for the scheduling information of the scheduled serving cells in the second-stage DCI.

According to the method disclosed above, the information related to the corresponding second-stage DCI in the first-stage DCI further includes the modulation order of the second-stage DCI.

According to the method disclosed above, the information related to the corresponding second-stage DCI in the first-stage DCI further includes the antenna port of the reference signal used for demodulation of the second-stage DCI.

According to the method disclosed above, the first-stage DCI includes one set of CRC bits for the first-stage DCI.

According to the method disclosed above, the second-stage DCI includes one set of CRC bits for the second-stage DCI.

According to the method disclosed above, the size of the information related to the scheduled serving cells scheduled by the second-stage DCI is based on a higher-layer configuration for two-stage DCI based cross-carrier scheduling.

According to the method disclosed above, the time-frequency location and the size of an occupied radio resource provided in an RRC configuration and the first DC includes: a set of candidate time-frequency resource starting positions provided by the base station via RRC signaling to the UE; and the size of an occupied radio resource and the applied RRC configuration index for time-frequency starting positions indicated by the base station via the first-stage DCI to the UE.

According to the method disclosed above, the first-stage DCI is located in a DL control region, and the second-stage DCI is located in the DL control region, or in a non-DL-control region, or in both the DL control region and the non-DL-control region.

According to the method disclosed above, the scheduling information for the scheduled serving cells is aggregated in ascending or descending order based on a serving cell identification of each scheduled serving cell.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

In order to make the above purposes, features, and advantages of some embodiments of the present disclosure more comprehensible, the following is a detailed description in conjunction with the accompanying drawing.

It should be understood that the words "comprise" and include used in the present disclosure are used to indicate the existence of specific technical features, values, method steps, operations, units and/or components. However, it does not exclude that more technical features, numerical values, method steps, work processes, units, components, or any combination of the above can be added.

The words "first", "second", "third", "fourth", "fifth", and "sixth" are used to describe components, they are not used to indicate the priority order of or advance relationship, but only to distinguish components with the same name.

Figure 1:
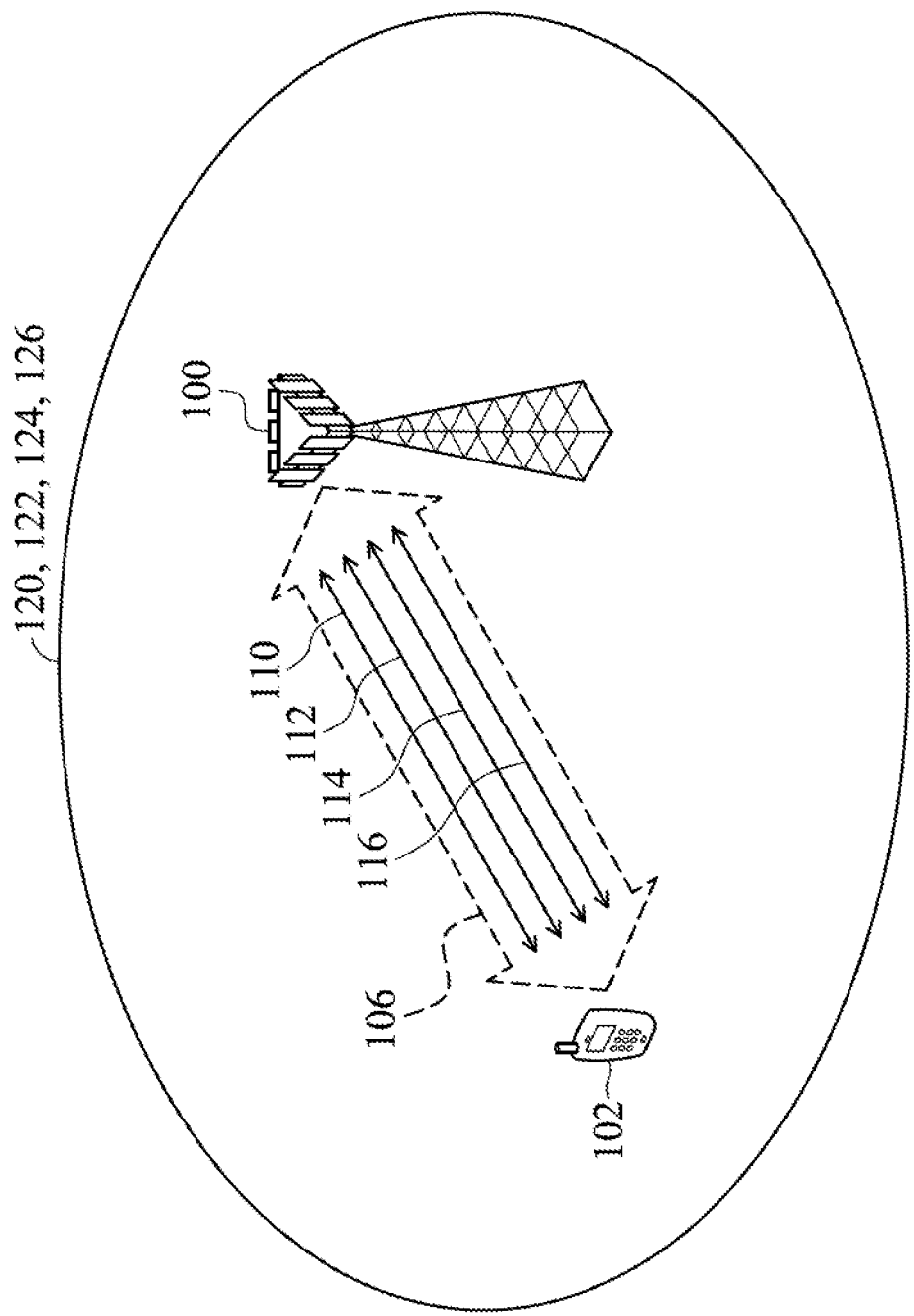
FIG. 1 is a schematic diagram of a scene of performing 2-stage downlink control information (DCI) based cross-carrier scheduling in carrier aggregation in accordance with some embodiments of the disclosure.

FIG. 1 is a schematic diagram of a scene of performing 2-stage downlink control information (DCI) based cross-carrier scheduling in carrier aggregation in accordance with some embodiments of the disclosure. As shown in FIG. 1, the scene in FIG. 1 includes a base station 100 and a UE 102. In some embodiments, the base station 100 can support New Radio (NR) with carrier aggregation. For example, the base station 100 can be a gNB, but the present disclosure is not limited thereto. The UE 102 may communicate with the base station 100 through an aggregated channel 106 including multiple carriers, such as a carrier 110, a carrier 112, a carrier 114, and a carrier 116.

In some embodiments, the UE 102 is able to connect with the base station 100 by Radio Resource Control (RRC) signaling for the carriers 110, 112, 114 and 116. For example, the UE 102 in a cell 120 is connected with the base station 100 through the carrier 110. The UE 102 in a cell 122 is connected with the base station 100 through the carrier 112. The UE 102 in a cell 124 is connected with the base station 100 through carrier 114. The UE 102 in a cell 126 is connected with the base station 100 through carrier 116. In FIG. 1, the cell 120 completely overlaps the cells 122, 124, and 126, but the present disclosure is not limited thereto.

When the UE 102 is configured with carrier aggregation in a UE connected mode via a higher-layer (or RRC-layer) signal from a serving gNB (for example, the base station 100 in FIG. 1), the UE 102 is configured with a set of serving cells (for example, the cells 120, 122, 124, and 126) for the connection to the network and then the UE 102 is activated all or part of the deactivated serving cells for downlink reception and uplink transmission. In some embodiments, the UE 102 may also be deactivated part of the activated serving cells for power saving when the UE 102 does not require so many serving cells for data reception or transmission.

In some embodiments, when the UE 102 is configured with carrier aggregation (for example, the aggregated channel 106) in the UE connected mode, the UE 102 can be further configured with cross-carrier scheduling via the higher-layer (or RRC-layer) signal from the serving gNB (for example, the base station 100) to enable scheduling information one serving cell (for example, the cell 120) and the scheduled physical downlink shared channel (PDSCH) or physical uplink shared channel (PUSCH) in another serving cells (for example, the cells 122, 124, and 126). The mapping between the scheduling cell (for example, the cell 120) and the scheduled cells (for example, the cells 122, 124, and 126) is provided to the UE 102 from the base station 100 via the higher-layer (or RRC-layer) signal.

When the UE 102 is configured with cross-carrier scheduling, the UE 102 can be further configured with 2-stage DCI based cross-carrier scheduling via a higher-layer (or RRC-layer) signal from the base station 100 to enable the use of 2-stage DCI providing scheduling information in one serving cell for the scheduled PDSCHs or PUSCHs in a set of serving cells. In some embodiments, when the UE 102 is configured with 2-stage DCI based cross-carrier scheduling, the scheduling information of PDSCHs or PUSCHs for one or more scheduled serving cells are partitioned into two parts, which are a first-stage DCI and a second-stage DCI. The UE 102 receives the first-stage DCI carried in a physical downlink control channel (PDCCH) in a slot in the scheduling serving cell (for example, the cell 120). The first-stage DCI provides the information related to the corresponding second-stage DCI.

The UE 102 receives the second-stage DCI corresponding to the first-stage DCI in a specific set of resource elements (for example, 1 subcarrier×1 symbol) in the same slot in the same scheduling cell (for example, the cell 120) as the first-stage DCI based on the information provided in the first-stage DCI. The second-stage DCI provides scheduling information for the scheduled serving cells (for example, the cells 122, 124, and 126).

Figure 2A:
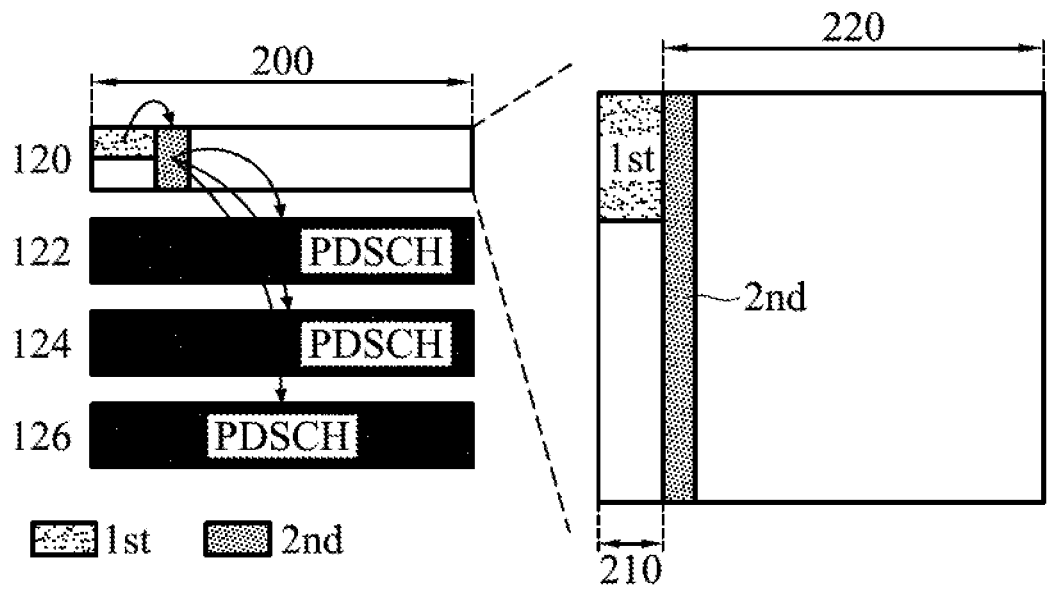
FIG. 2A is a schematic diagram of 2-stage DCI based cross-carrier scheduling in FIG. 1 when a second-stage DCI is in a non-DL-control region of a slot in accordance with some embodiments of the disclosure.

FIG. 2A is a schematic diagram of 2-stage DCI based cross-carrier scheduling in FIG. 1 when a second-stage DCI (2nd) is in a non-DL-control region 220 of a slot 200 in accordance with some embodiments of the disclosure. As shown in FIG. 2A, the UE 102 receives the high-layer signal from the base station 100 through the carrier 110 in the cell 120 (as the serving cell). The high-layer signal from the base station 100 includes a slot 200, and the first-stage DCI (1st) and the second-stage DCI (2nd) are carried in the slot 200. In FIG. 2A, the first-stage DCI (1st) is located in a DL control region 210. The DL control region 210 is a set of resource elements reserved for PDCCH. The second-stage DCI (2nd) is located in the specific set of resource elements in the non-DL-control region 220. The non-DL-control region 220 is a set of resource elements not dedicatedly reserved for PDCCH. In some embodiments, the PDCCH can be either a UE-specific PDCCH or a group-common PDCCH, but the present disclosure is not limited thereto.

The arrow from the first-stage DCI (1st) pointing to the second-stage DCI (2nd) means that the first-stage DCI (1st) provides the information related to the corresponding second-stage DCI (2nd). In some embodiments, the information related to the corresponding second-stage DCI (2nd) includes information related to the scheduled cells, selected from cells 122, 124 and 126, scheduled by the second-stage DCI (2nd), and the time-frequency location and size of an occupied radio resource for the scheduling information of the cells 122, 124 and 126 in the second-stage DCI (2nd). In some embodiments, for better spectrum efficiency, the information related to the corresponding second-stage DCI (2nd) further includes at least one of the modulation order of the second-stage DCI (2nd) and the antenna port of the reference signal used for demodulation of the second-stage DCI (2nd).

In some embodiments, the size of the information related to the cells 122, 124, and 126 scheduled by the second-stage DCI (2nd) is based on a higher-layer (or RRC-layer) configuration for two-stage DCI based cross-carrier scheduling, e.g. the number of serving cells to be scheduled by a scheduling serving cell (for example, the cell 120). The highest modulation order for the second-stage DCI (2nd) can be provided to the UE 102 from the base station 100 (the serving gNB) via the higher-layer signal. If the highest modulation order is not provided to the UE 102 from the base station 100 via the higher-layer signal, the UE 102 may assume QPSK modulation order for the second-stage DCI (2nd).

Time-frequency location and size of an occupied radio resource for the scheduling information of the cells 122, 124 and 126 in the second-stage DCI (2nd) includes 3 options, that is option #1: full time-frequency location and size of an occupied radio resource provided in the first-stage DCI (1st), option #2A: full time-frequency location and the size of an occupied radio resource provided in an RRC configuration and the first-stage DCI (1st), and option #2B: full time-frequency location and the size of an occupied radio resource provided in an RRC configuration and the first-stage DCI (1st). In option #1, the first-stage DCI (1st) provides a starting symbol and a symbol duration in the time domain, and a starting resource block and resource block number in the frequency domain.

In option #2A, the base station 100 provides a set of candidate time-frequency starting positions to the UE 102 via RRC signaling. In option #2A, the base station 100 further indicates the size of an occupied radio resource and the applied RRC configuration index for time-frequency starting positions to the UE 102 via the first-stage DCI (1st). In option #2B, the base station 100 provides a set of candidate time-frequency starting positions and sizes to the UE 102 via RRC signaling. In option #2B, the base station 100 further indicates the applied RRC configuration index to the UE 102 via the first-stage DCI (1st). In some embodiments, one example reference signal used for the second-stage DCI demodulation is the demodulation reference signal used for PDSCH. In some embodiments, the first-stage DCI (1st) further includes one set of cyclic redundancy check (CRC) bits for the first-stage DCI. In some embodiments, the number of CRC bits for each carrier (for example, the carrier 110, or the carrier 112, or the carrier 114, or the carrier 116) is 24, but the present disclosure is not limited thereto.

The arrow from the second-stage DCI (2nd) pointing to the cells 122, 124, and 126 means that the second-stage DCI (2nd) provides scheduling information for the cells 122, 124, and 126. The second-stage DCI (2nd) is in the same slot 200 as the first-stage DCI (1st). In some embodiments, the second-stage DCI (2nd) includes all necessary scheduling information for the cells 122, 124, and 126 (as the scheduled serving cells). The scheduling information for the cells 122, 124, and 126 is aggregated in ascending or descending order based on the serving cell identification of each of the cells 122, 124, and 126. In some embodiments, the size of the scheduling information for each of the cells 122, 124, and 126 is based on the RRC configuration of each of the cells 122, 124, and 126. In some embodiments, the second-stage DCI (2nd) further includes one set of CRC bits for the second-stage DCI (2nd). Since no blind decoding is needed for the second-stage DCI (2nd) and the false alarm rate is dominated by the first-stage DCI (1st), the number of CRC bits for the second-stage DCI (2nd) can be smaller than that for the first-stage DCI (1st). For example, the number of CRC bits for the second-stage DCI (2nd) is less than 24 bits, but the present disclosure is not limited thereto. In some embodiments, when there is no serving cell to be scheduled by the second-stage DCI (2nd), the second-stage DCI (2nd) is absent.

In addition, since the time-frequency location of the second-stage DCI (2nd) are all known which are indicated by the first-stage DCI (1st), no blind decoding is needed for the second-stage DCI (2nd), which saves a lot of processing time for the UE 102 to decode the DCI in carrier aggregation. Furthermore, 2-stage DCI based cross-carrier scheduling also saves CRC overhead when it is used to schedule two or more serving cells.

Figure 2B:
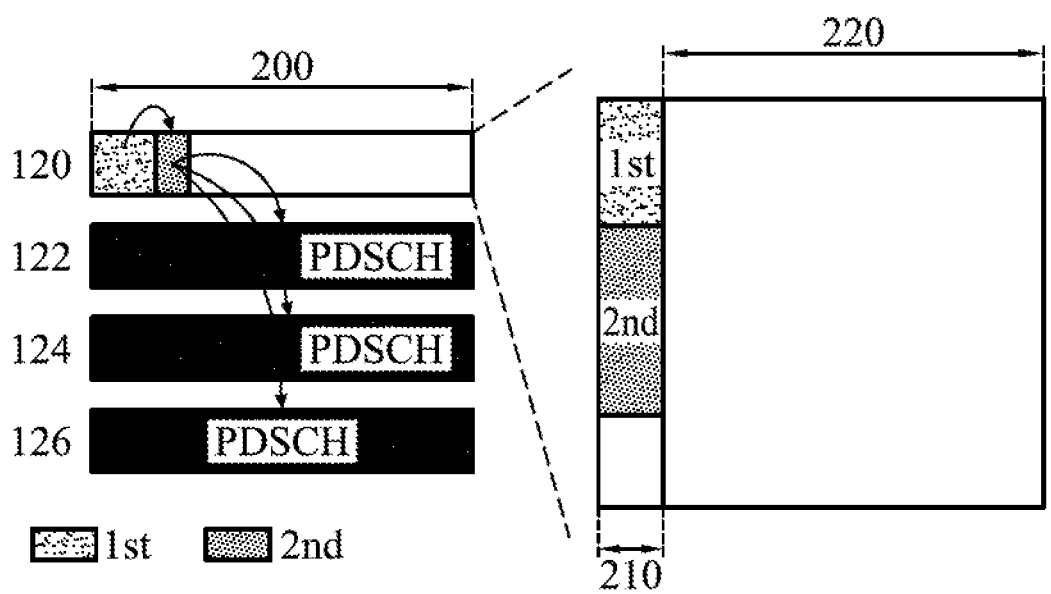
FIG. 2B is a schematic diagram of 2-stage DCI based cross-carrier scheduling in FIG. 1 when the second-stage DCI is in a DL-control region of the slot in accordance with some embodiments of the disclosure.

FIG. 2B is a schematic diagram of 2-stage DCI based cross-carrier scheduling in FIG. 1 when the second-stage DCI (2nd) is in a DL-control region 210 of the slot 200 in accordance with some embodiments of the disclosure. As shown in FIG. 2B, the UE 102 receives the high-layer signal from the base station 100 through the carrier 110 in the cell 120 (as the serving cell). The high-layer signal from the base station 100 includes the slot 200, and the first-stage DCI (1st) and the second-stage DCI (2nd) are both carried in the slot 200. In FIG. 2B, the first-stage DCI (1st) and the second-stage DCI (2nd) are both located in the DL control region 210. The setting in FIG. 2B is the same as that in FIG. 2A except for the location of the second-stage DCI (2nd), and so the description will not be repeated herein.

Figure 2C:
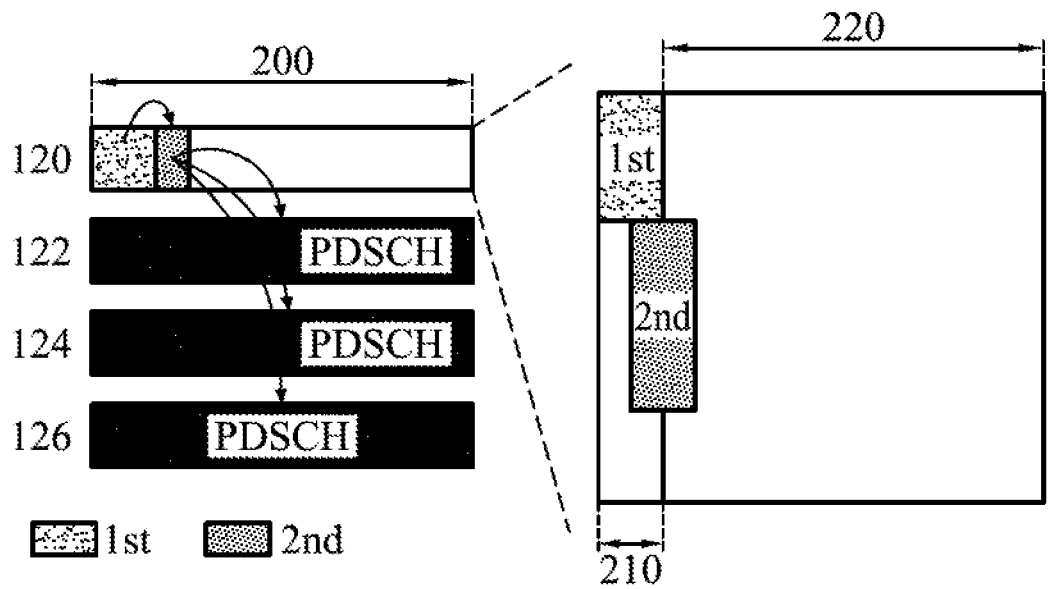
FIG. 2C is a schematic diagram of 2-stage DCI based cross-carrier scheduling in FIG. 1 when the second-stage DCI is in both DL-control region and non-DL-control region of the slot in accordance with some embodiments of the disclosure.

FIG. 2C is a schematic diagram of 2-stage DCI based cross-carrier scheduling in FIG. 1 when the second-stage DCI (2nd) is in both DL-control region 210 and non-DL-control region 220 of the slot 200 in accordance with some embodiments of the disclosure. As shown in FIG. 2C, the UE 102 receives the high-layer signal from the base station 100 through the carrier 110 in the cell 120 (as the serving cell). The high-layer signal from the base station 100 includes the slot 200, and the first-stage DCI (1st) and the second-stage DCI (2nd) are both carried in the slot 200. In FIG. 2C, the first-stage DCI (1st) is located in the DL control region 210. However, the second-stage DCI (2nd) is located in both the DL-control region 210 and the non-DL-control region 220. In other words, parts of the second-stage DCI (2nd) is located in the DL-control region 210, and the other parts of the second-stage DCI (2nd) is located in the non-DL-control region 220. The setting in FIG. 2C is the same as that in FIG. 2A except for the location of the second-stage DCI (2nd), and so the description will not be repeated herein.

In some embodiments, when the UE 102 is configured with 2-stage DCI based cross-carrier scheduling, the serving cell is used to provide the scheduling information of PDSCHs or PUSCHs for the scheduled serving cells. The scheduling information of PDSCHs or PUSCHs for one or more scheduled serving cells are partitioned into two parts, which are a first-stage DCI and a second-stage DCI. The UE 102 receives the first-stage DCI carried in a physical downlink control channel (PDCCH) in a slot in the scheduling serving cell (for example, the cell 120). The first-stage DCI provides the scheduling information for one of the scheduled serving cells (for example, the cell 122) and the information related to the corresponding second-stage DCI.

The UE 102 receives the second-stage DCI corresponding to the first-stage DCI in a specific set of resource elements in the same slot in the same scheduling cell (for example, the cell 120) as the first-stage DCI based on the information provided in the first-stage DCI. The second-stage DCI provides scheduling information for the scheduled serving cells (for example, the cells 124, and 126) except for the serving cell scheduled by the first-stage DCI (for example, the cells 122).

Figure 3A:
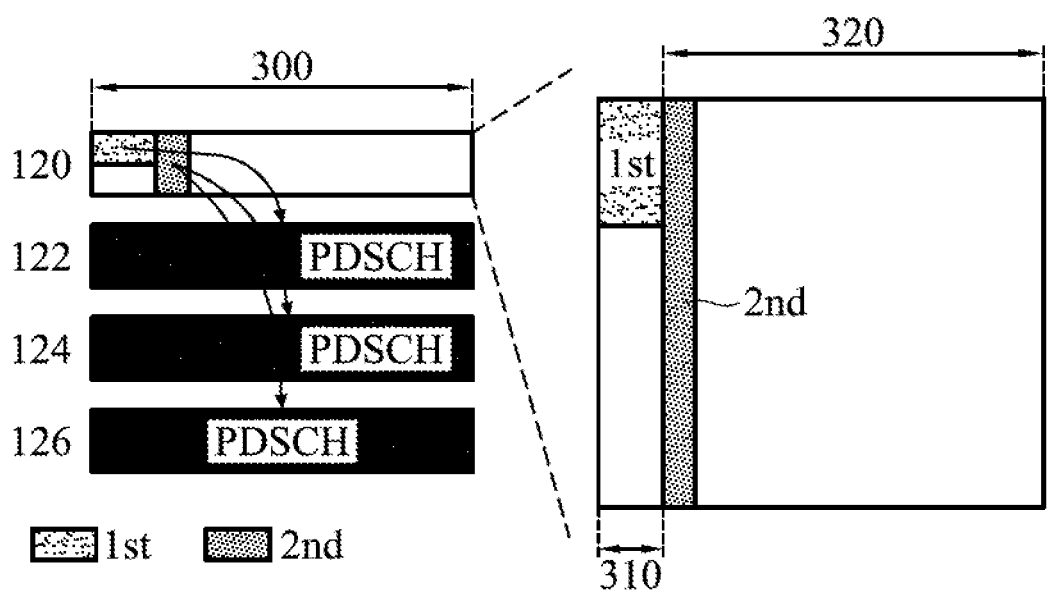
FIG. 3A is a schematic diagram of 2-stage DCI based cross-carrier scheduling in FIG. 1 when a second-stage DCI is in a non-DL-control region of a slot in accordance with some embodiments of the disclosure.

FIG. 3A is a schematic diagram of 2-stage DCI-based cross-carrier scheduling in FIG. 1 when a second-stage DCI (2nd) is in a non-DL-control region 320 of a slot 300 in accordance with some embodiments of the disclosure. As shown in FIG. 3A, the UE 102 receives the high-layer signal from the base station 100 through the carrier 110 in the cell 120 (as the serving cell). The high-layer signal from the base station 100 includes a slot 300, and the first-stage DCI (1st) and the second-stage DCI (2nd) are carried in the slot 300. In FIG. 3A, the first-stage DCI (1st) is located in a DL control region 310. The DL control region 310 is a set of resource elements reserved for PDCCH. The second-stage DCI (2nd) is located in the specific set of resource elements in the non-DL-control region 320. The non-DL-control region 320 is a set of resource elements not dedicatedly reserved for PDCCH. In some embodiments, the PDCCH can be either a UE-specific PDCCH or a group-common PDCCH, but the present disclosure is not limited thereto.

The arrow from the first-stage DCI (1st) pointing to the cell 122 means that the first-stage DCI (1st) provides scheduling information for the cell 122. The first-stage DCI (1st) includes all scheduling information for one of the scheduled serving cells (for example, the cell 122) and the information related to the second-stage DCI (2nd). The information related to the second-stage DCI (2nd) at least includes information related to the scheduled serving cells, selected from the cells 124 and 126, (for example, the cells 124 and 126) scheduled by the second-stage DCI (2nd), and the time-frequency location and size of an occupied radio resource for the scheduling information of the scheduled serving cells (for example, the cells 124 and 126) in the second-stage DCI (2nd). In some embodiments, for better spectrum efficiency, the information related to the corresponding second-stage DCI (2nd) further includes at least one of the modulation order of the second-stage DCI (2nd) and the antenna port of the reference signal used for demodulation of the second-stage DCI (2nd).

In some embodiments, the size of the information related to the cells 124 and 126 scheduled by the second-stage DCI (2nd) is based on a higher-layer (or RRC-layer) configuration for two-stage DCI based cross-carrier scheduling, e.g. the number of serving cells to be scheduled by a scheduling serving cell (for example, the cell 120). In order to reduce the maximum number of bits, the maximum number of serving cells scheduled by one serving cell using 2-stage DCI can be fixed to a specific number, such as 4. The highest modulation order for the second-stage DCI (2nd) can be provided to the UE 102 from the base station 100 (the serving gNB) via the higher-layer signal. If the highest modulation order is not provided to the UE 102 from the base station 100 via the higher-layer signal (or RRC-layer), the UE 102 may assume QPSK modulation order for the second-stage DCI (2nd).

Time-frequency location and size of an occupied radio resource for the scheduling information of the cells 124 and 126 in the second-stage DCI (2nd) includes 4 options. In option #1, the base station 100 provides a set of candidate time-frequency resource starting positions to the UE 102 via RRC signaling. In option #1, the base station 100 further indicates the size of an occupied radio resource and the applied RRC configuration index for time-frequency starting positions to the UE 102 via the first-stage DCI (1st). In option #2, the base station 100 provides a set of candidate time-frequency resource starting positions to the UE 102 via RRC signaling. In option #2, the base station 100 further indicates the applied RRC configuration index for time-frequency starting position to the UE 102 via the first-stage DCI (1st). In option #2, the UE 102 derives the size of time-frequency resource based on the resource size of the first-stage DCI (1st) (for example, X control channel elements (CCEs)) and the information related to which serving cells are scheduled by the second-stage DCI (2nd) (for example, the number of scheduled serving cells is equal to Y). Total RB-symbol number for the second-stage DCI (2nd) is proportional to X*Y.

In option #3, the base station provides a set of candidate time-frequency resource starting positions to the UE 102 via RRC signaling. In option #3, the base station 100 provides a scaling factor (or an offset) relative to the resource size of the first-stage DCI (1st) per the modulation order of the second-stage DCI (2nd) to the UE 102 via RRC signaling for the resource size derivation of the second-stage DCI (2nd). In option #3, the base station 100 further indicates the applied RRC configuration index for time-frequency starting position to the UE 102 via the first-stage DCI (1st). In option #3, the UE 102 derives the size of the time-frequency resource based on the resource size of the first-stage DCI (e.g. X CCEs), a scaling factor (or an offset) (e.g. Z), the modulation order of the second-stage DCI (2nd) and the information related to which serving cells are scheduled by the second-stage DCI (2nd) (for example, the number of scheduled serving cells is equal to Y). Total RB-symbol number for the second-stage DCI is proportional to X*Y*Z (that is, the modulation order of the second-stage DCI (2nd)).

In option #4, the base station 100 provides a set of candidate time-frequency resource locations and resource sizes to the UE 102 via RRC signaling. In option #4, the base station further indicates the applied RRC configuration index to the UE 102 via the first-stage DCI (1st). In some embodiments, one example reference signal used for the second-stage DCI (2nd) demodulation is the demodulation reference signal used for PDSCH. One example reference signal used for the second-stage DCI (2nd) demodulation is the demodulation reference signal used for PDCCH. In some embodiments, the first-stage DCI (1st) further includes one set of CRC bits for the first-stage DCI (1st). In some embodiments, the number of CRC bits for each carrier (for example, the carrier 110, or the carrier 112, or the carrier 114, or the carrier 116) is 24, but the present disclosure is not limited thereto.

The arrow from the second-stage DCI (2nd) pointing to the cells 124 and 126 means that the second-stage DCI (2nd) provides scheduling information for the cells 124 and 126. The second-stage DCI (2nd) is in the same slot 200 as the first-stage DCI (1st). In some embodiments, the second-stage DCI (2nd) includes all necessary scheduling information for the cells 124 and 126 (as the scheduled serving cells). The scheduling information for the cells 124, and 126 is aggregated in ascending or descending order based on the serving cell identification of each of the cells 122, 124, and 126. In some embodiments, the size of the scheduling information for each of the cells 124, and 126 is based on the RRC configuration of each of the cells 124 and 126. In some embodiments, the second-stage DCI (2nd) further includes one set of CRC bits for the second-stage DCI (2nd). Since no blind decoding is needed for the second-stage DCI (2nd) and the false alarm rate is dominated by the first-stage DCI (1st), the number of CRC bits for the second-stage DCI (2nd) can be smaller than that for the first-stage DCI (1st). For example, the number of CRC bits for the second-stage DCI (2nd) is less than 24 bits, but the present disclosure is not limited thereto. In some embodiments, when there is no serving cell to be scheduled by the second-stage DCI (2nd), the second-stage DCI (2nd) is absent.

Since the starting location, information size and resource size of the second-stage DCI (2nd) are all known after receiving the RRC configuration and the first-stage DCI (1st), no blind decoding is needed for the second-stage DCI (2nd), which saves a lot of processing time for the UE 102 to decode the DCI in carrier aggregation. In addition, only 2 sets of CRC bits are needed for 2-stage DCI for scheduling two or more serving cells, thus the 2-stage DCI also saves CRC overhead.

Figure 3B:
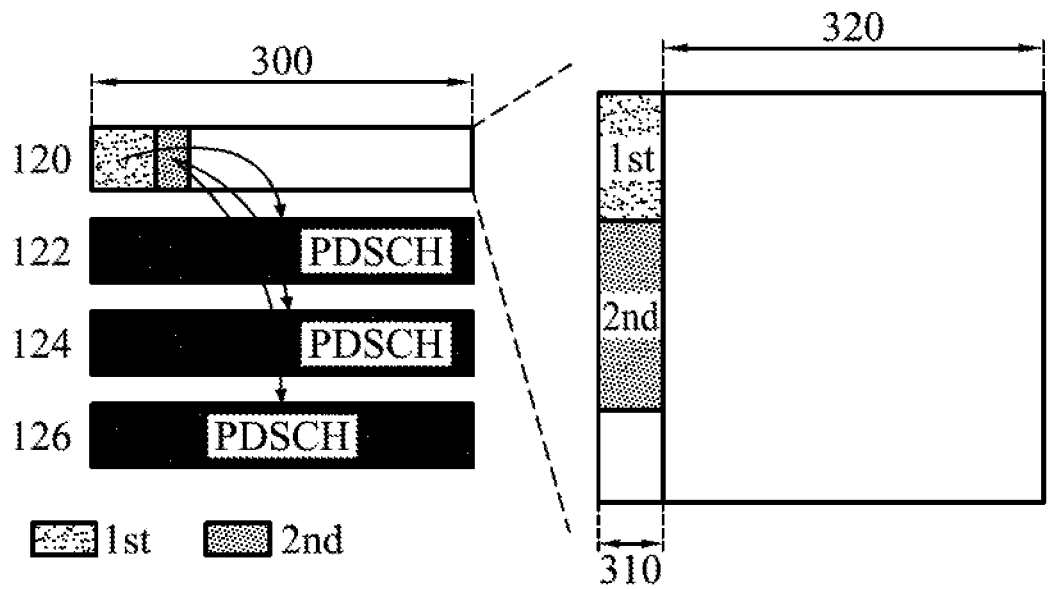
FIG. 3B is a schematic diagram of 2-stage DCI based cross-carrier scheduling in FIG. 1 when the second-stage DCI is in a DL-control region of the slot in accordance with some embodiments of the disclosure.

FIG. 3B is a schematic diagram of 2-stage DCI based cross-carrier scheduling in FIG. 1 when the second-stage DCI (2nd) is in a DL-control region 310 of the slot 300 in accordance with some embodiments of the disclosure. As shown in FIG. 3B, the UE 102 receives the high-layer signal from the base station 100 through the carrier 110 in the cell 120 (as the serving cell). The high-layer signal from the base station 100 includes the slot 300, and the first-stage DCI (1st) and the second-stage DCI (2nd) are both carried in the slot 300. In FIG. 3B, the first-stage DCI (1st) and the second-stage DCI (2nd) are both located in the DL control region 310. The setting in FIG. 3B is the same as that in FIG. 3A except for the location of the second-stage DCI (2nd), and so the description will not be repeated herein.

Figure 3C:
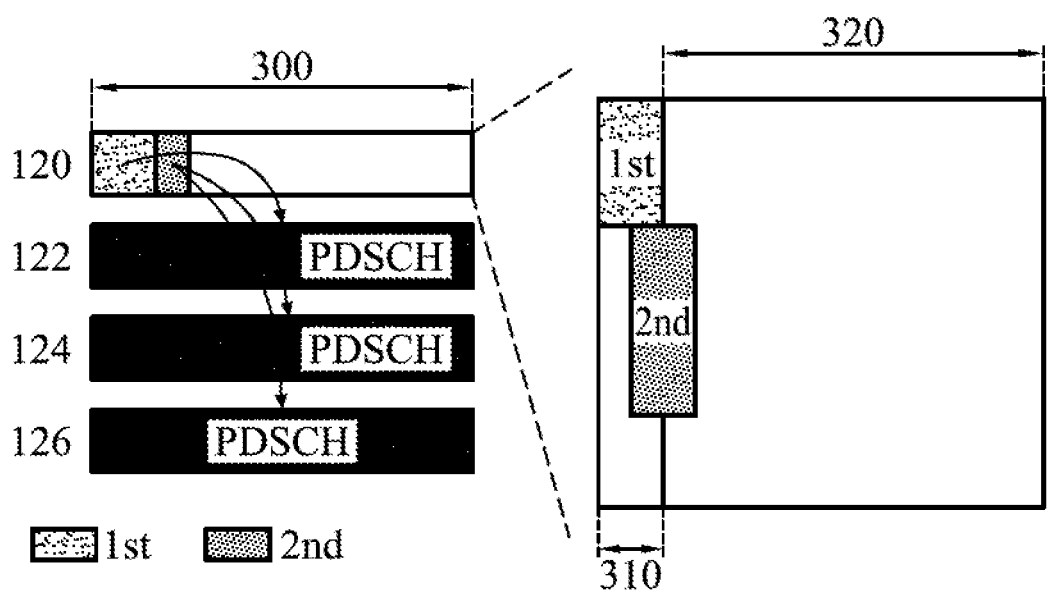
FIG. 3C is a schematic diagram of 2-stage DCI based cross-carrier scheduling in FIG. 1 when the second-stage DCI is in both DL-control region and non-DL-control region of the slot in accordance with some embodiments of the disclosure.

FIG. 3C is a schematic diagram of 2-stage DCI-based cross-carrier scheduling in FIG. 1 when the second-stage DCI (2nd) is in both DL-control region 310 and non-DL-control region 320 of the slot 300 in accordance with some embodiments of the disclosure. As shown in FIG. 3C, the UE 102 receives the high-layer signal from the base station 100 through the carrier 110 in the cell 120 (as the serving cell). The high-layer signal from the base station 100 includes the slot 300, and the first-stage DCI (1st) and the second-stage DCI (2nd) are both carried in the slot 300. In FIG. 3C, the first-stage DCI (1st) is located in the DL control region 310. However, the second-stage DCI (2nd) is located in both the DL-control region 310 and the non-DL-control region 320. In other words, parts of the second-stage DCI (2nd) is located in the DL-control region 310, and the other parts of the second-stage DCI (2nd) is located in the non-DL-control region 320. The setting in FIG. 3C is the same as that in FIG. 3A except for the location of the second-stage DCI (2nd), and so the description will not be repeated herein.

Figure 4:
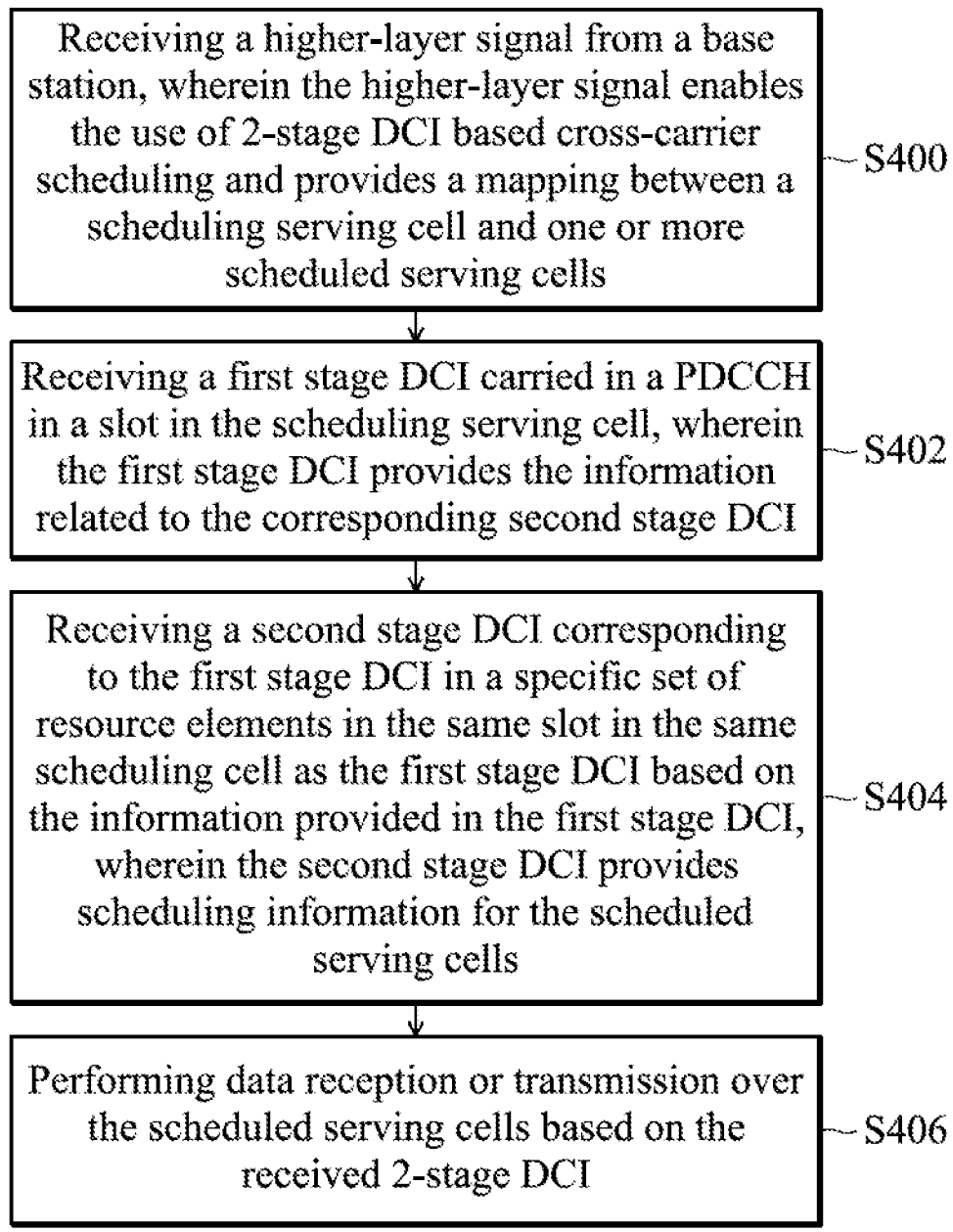
FIG. 4 is a flow chart of a method of performing 2-stage DCI based cross-carrier scheduling in carrier aggregation in accordance with some embodiments of the disclosure.

FIG. 4 is a flow chart of a method of performing 2-stage DCI based cross-carrier scheduling in carrier aggregation in accordance with some embodiments of the disclosure. As shown in FIG. 4, a method of performing 2-stage downlink control information (DCI) based cross-carrier scheduling in carrier aggregation of the present disclosure includes receiving a higher-layer signal from a base station, wherein the higher-layer signal enables the use of 2-stage DCI based cross-carrier scheduling and provides mapping between a scheduling serving cell and one or more scheduled serving cells (step S400); receiving a first-stage DCI carried in a PDCCH in a slot in the scheduling serving cell, wherein the first-stage DCI provides the information related to the corresponding second-stage DCI (step S402); receiving a second-stage DCI corresponding to the first-stage DCI in a specific set of resource elements in the same slot in the same scheduling cell as the first-stage DCI based on the information provided in the first-stage DCI, wherein the second-stage DCI provides scheduling information for the scheduled serving cells (step S404); and performing data reception or transmission over the scheduled serving cells based on the received 2-stage DCI (step S406). In some embodiments, steps 400~406 are performed by a UE (for example, the UE 102 in FIG. 1).

Figure 5:
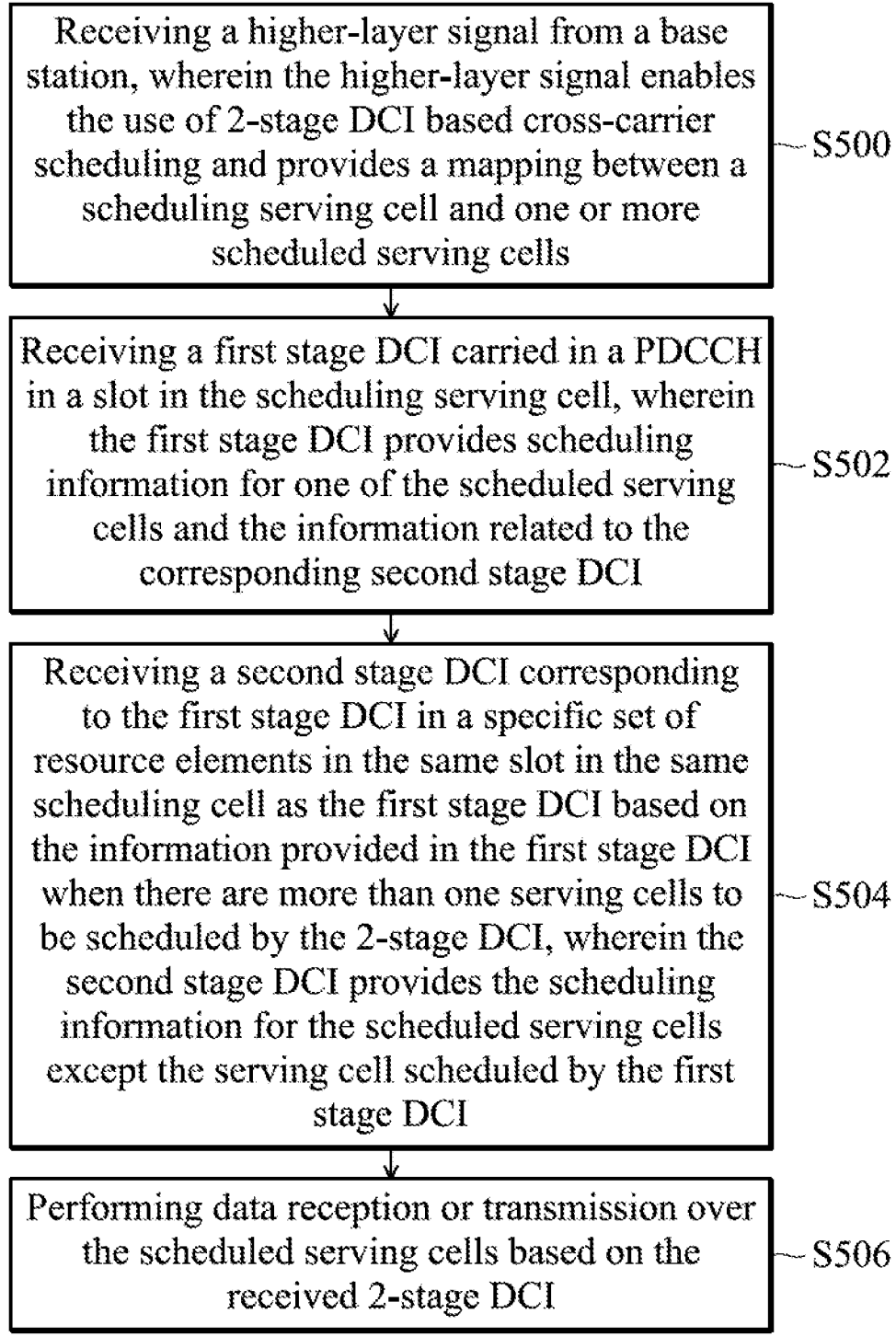
FIG. 5 is a flow chart of a method of performing 2-stage DCI based cross-carrier scheduling in carrier aggregation in accordance with some embodiments of the disclosure.

FIG. 5 is a flow chart of a method of performing 2-stage DCI based cross-carrier scheduling in carrier aggregation in accordance with some embodiments of the disclosure. As shown in FIG. 5, a method of performing 2-stage downlink control information (DCI) based cross-carrier scheduling in carrier aggregation of the present disclosure includes receiving a higher-layer signal from a base station, wherein the higher-layer signal enables the use of 2-stage DCI-based cross-carrier scheduling and provides mapping between a scheduling serving cell and one or more scheduled serving cells (step S500); receiving a first-stage DCI carried in a PDCCH in a slot in the scheduling serving cell, wherein the first-stage DCI provides scheduling information for one of the scheduled serving cells and the information related to the corresponding second-stage DCI (step S502); receiving a second-stage DCI corresponding to the first-stage DCI in a specific set of resource elements in the same slot in the same scheduling cell as the first-stage DCI based on the information provided in the first-stage DCI when there is more than one serving cell to be scheduled by the 2-stage DCI, wherein the second-stage DCI provides scheduling information for the scheduled serving cells except for the serving cell scheduled by the first-stage DCI (step S504); and performing data reception or transmission over the scheduled serving cells based on the received 2-stage DCI (step S506). In some embodiments, steps 500~506 are performed by a UE (for example, the UE 102 in FIG. 1).

The present disclosure proposes a design to use single physical downlink control channel (PDCCH) on a carrier to schedule physical downlink shared channel (PDSCH) or physical uplink shared channel (PUSCH) in two or more serving cells in carrier aggregation to get similar downlink and uplink transmission efficiency as single carrier. The proposed design includes 2-stage downlink control information (DCI) to schedule PDSCH or PUSCH in one or more serving cells in carrier aggregation.

The embodiments of the present disclosure are disclosed above, but they are not used to limit the scope of the present disclosure. A person skilled in the art can make some changes and retouches without departing from the spirit and scope of the embodiments of the present disclosure. Therefore, the scope of protection in the present disclosure shall be deemed as defined by the scope of the attached claims.

What is claimed is:

1. A method, applied to a user equipment (UE), to perform 2-stage downlink control information (DCI) based cross-carrier scheduling in carrier aggregation, the method comprising:
    receiving a higher-layer signal from a base station, wherein the higher-layer signal enables the use of 2-stage DCI based cross-carrier scheduling and provides mapping between a scheduling serving cell and one or more scheduled serving cells;
    receiving a first-stage DCI carried in a Physical Downlink Control Channel (PDCCH) in a designated time interval in the scheduling serving cell, wherein the first-stage DCI provides information related to the corresponding second-stage DCI;
    receiving a second-stage DCI corresponding to the first-stage DCI in a specific set of resource elements in the same designated time interval in the same scheduling cell as the first-stage DCI based on the information provided in the first-stage DCI, wherein the second-stage DCI provides scheduling information for the scheduled serving cells; and
    performing data reception or transmission over the scheduled serving cells based on the received 2-stage DCI;
    wherein the first-stage DCI is located in a downlink (DL) control region, and the second-stage DCI is located in the DL control region, or in a non-DL-control region, or in both the DL control region and the non-DL-control region.

2. The method as claimed in claim 1, wherein the first-stage DCI provides scheduling information for one of the scheduled serving cells.

3. The method as claimed in claim 2, wherein when there is more than one serving cell to be scheduled by the 2-stage DCI, the second-stage DCI provides the scheduling information for the scheduled serving cells except for the serving cell scheduled by the first-stage DCI.

4. The method as claimed in claim 3, wherein the information related to the corresponding second-stage DCI in the first-stage DCI at least comprises:
    information related to the scheduled serving cells scheduled by the second-stage DCI;
    the time-frequency location and size of an occupied radio resource for the scheduling information of the scheduled serving cells in the second-stage DCI.

5. The method as claimed in claim 4, wherein the information related to the corresponding second-stage DCI in the first-stage DCI further comprises:
    the antenna port of the reference signal used for demodulation of the second-stage DCI.

6. The method as claimed in claim 4, wherein the information related to the corresponding second-stage DCI in the first-stage DCI further comprises:
    the modulation order of the second-stage DCI.

7. The method as claimed in claim 4, wherein the size of the information related to the scheduled serving cells scheduled by the second-stage DCI is based on a higher-layer configuration for two-stage DCI based cross-carrier scheduling.

8. The method as claimed in claim 4, wherein the time-frequency location and the size of an occupied radio resource provided in an RRC configuration and the first DC comprises:
    a set of candidate time-frequency resource starting positions provided by the base station via RRC signaling to the UE; and the size of an occupied radio resource and the applied RRC configuration index for time-frequency starting positions indicated by the base station via the first-stage DCI to the UE.

9. The method as claimed in claim 3, wherein the first-stage DCI comprises one set of CRC bits for the first-stage DCI.

10. The method as claimed in claim 3, wherein the second-stage DCI comprises one set of CRC bits for the second-stage DCI.

11. The method as claimed in claim 3, wherein the first-stage DCI is located in a DL control region, and the second-stage DCI is located in the DL control region, or in a non-DL-control region, or in both the DL control region and the non-DL-control region.

12. The method as claimed in claim 3, wherein the scheduling information for the scheduled serving cells is aggregated in ascending or descending order based on a serving cell identification of each scheduled serving cell.

13. The method as claimed in claim 1, wherein the information related to the corresponding second-stage DCI in the first-stage DCI at least comprises:
  information related to the scheduled serving cells scheduled by the second-stage DCI; and
  time-frequency location and size of an occupied radio resource for the scheduling information of the scheduled serving cells in the second-stage DCI.

14. The method as claimed in claim 13, wherein the information related to the corresponding second-stage DCI in the first-stage DCI further comprises:
  antenna port of a reference signal used for demodulation of the second-stage DCI.

15. The method as claimed in claim 13, wherein the information related to the corresponding second-stage DCI in the first-stage DCI further comprises:
  modulation order of the second-stage DCI.

16. The method as claimed in claim 13, wherein the size of the information related to the scheduled serving cells scheduled by the second-stage DCI is based on a higher-layer configuration for two-stage DCI based cross-carrier scheduling.

17. The method as claimed in claim 16, wherein the higher-layer configuration is a Radio Resource Control (RRC)-layer configuration, and the size of the information related to the scheduled serving cells scheduled by the second-stage DCI is based on the number of scheduled serving cells scheduled by the scheduling serving cell.

18. The method as claimed in claim 13, wherein the time-frequency location and the size of an occupied radio resource for the scheduling information of the scheduled serving cells in the second-stage DCI comprise:
  the time-frequency location and the size of an occupied radio resource provided in the first-stage DCI; or
  the time-frequency location and the size of an occupied radio resource provided in a Radio Resource Control (RRC) configuration and the first-stage DCI.

19. The method as claimed in claim 18, wherein the time-frequency location and the size of an occupied radio resource provided in the first-stage DCI comprises:
  a starting symbol and a symbol duration in time domain; and
  a starting resource block and resource block number in frequency domain.

20. The method as claimed in claim 18, wherein the time-frequency location and the size of an occupied radio resource provided in an RRC configuration and the first-stage DCI comprises:
  a set of candidate time-frequency starting positions provided by the base station via RRC signaling to the UE; and
  the size of an occupied radio resource and the applied RRC configuration index for time-frequency starting positions indicated by the base station via the first-stage DCI to the UE.

21. The method as claimed in claim 1, wherein the first-stage DCI comprises one set of cyclic redundancy check (CRC) bits for the first-stage DCI.

22. The method as claimed in claim 1, wherein the second-stage DCI comprises one set of CRC bits for the second-stage DCI.

23. The method as claimed in claim 1, wherein the scheduling information for the scheduled serving cells is aggregated in ascending or descending order based on a serving cell identification of each scheduled serving cell.

* * * * *